(12) United States Patent
Parvizian et al.

(10) Patent No.: US 10,557,507 B2
(45) Date of Patent: Feb. 11, 2020

(54) PLATE CARRYING DEVICE, MULTIPLATE CLUTCH OR BRAKE AND METHOD FOR PRODUCING A PLATE CARRYING DEVICE

(71) Applicant: BorgWarner Inc., Auburn Hills, MI (US)

(72) Inventors: Farhad Parvizian, Heidelberg (DE); Katharina Skop-Cardarella, Speyer (DE)

(73) Assignee: BorgWarner Inc., Auburn Hills, MI (US)

( * ) Notice: Subject to any disclaimer, the term of this patent is extended or adjusted under 35 U.S.C. 154(b) by 277 days.

(21) Appl. No.: 15/514,417

(22) PCT Filed: Sep. 15, 2015

(86) PCT No.: PCT/US2015/050075
§ 371 (c)(1),
(2) Date: Mar. 24, 2017

(87) PCT Pub. No.: WO2016/048706
PCT Pub. Date: Mar. 31, 2016

(65) Prior Publication Data
US 2017/0276190 A1 Sep. 28, 2017

(30) Foreign Application Priority Data
Sep. 25, 2014 (DE) .......................... 10 2014 014 235

(51) Int. Cl.
*F16D 13/74* (2006.01)
*F16D 13/68* (2006.01)
(Continued)

(52) U.S. Cl.
CPC .......... *F16D 13/683* (2013.01); *B21D 53/04* (2013.01); *F16D 55/00* (2013.01); *F16D 13/74* (2013.01);
(Continued)

(58) Field of Classification Search
CPC ............. F16D 55/00; F16D 2250/0023; F16D 2055/0008; F16D 13/68; F16D 13/683;
(Continued)

(56) References Cited

U.S. PATENT DOCUMENTS 3,915,272 A * 10/1975 Maurice ................. F16D 13/52
188/71.5
4,813,522 A * 3/1989 Fujioka ................. F16D 13/52
192/70.2
(Continued)

FOREIGN PATENT DOCUMENTS

EP 2 110 574 B1 10/2011

OTHER PUBLICATIONS

International Search Report for Application No. PCT/US2015/050075 dated Dec. 18, 2015, 4 pages.
(Continued)

*Primary Examiner* — Jacob S. Scott
*Assistant Examiner* — Lillian T Nguyen
(74) *Attorney, Agent, or Firm* — Howard & Howard Attorneys PLLC

(57) ABSTRACT

A multiplate clutch or brake has a plate carrying device (2) having a plate carrier (4). The plate carrier (4) has a tubular section (24). The plate carrying device (2) also has a supporting ring (6), which surrounds the tubular section (24) and on which the tubular section (24) can be supported or is supported outwardly in a radial direction (12). A cross section of the supporting ring (6) has at least one radial leg (30; 38) extending substantially in a radial direction (12, 14).

17 Claims, 4 Drawing Sheets

Figure 1:
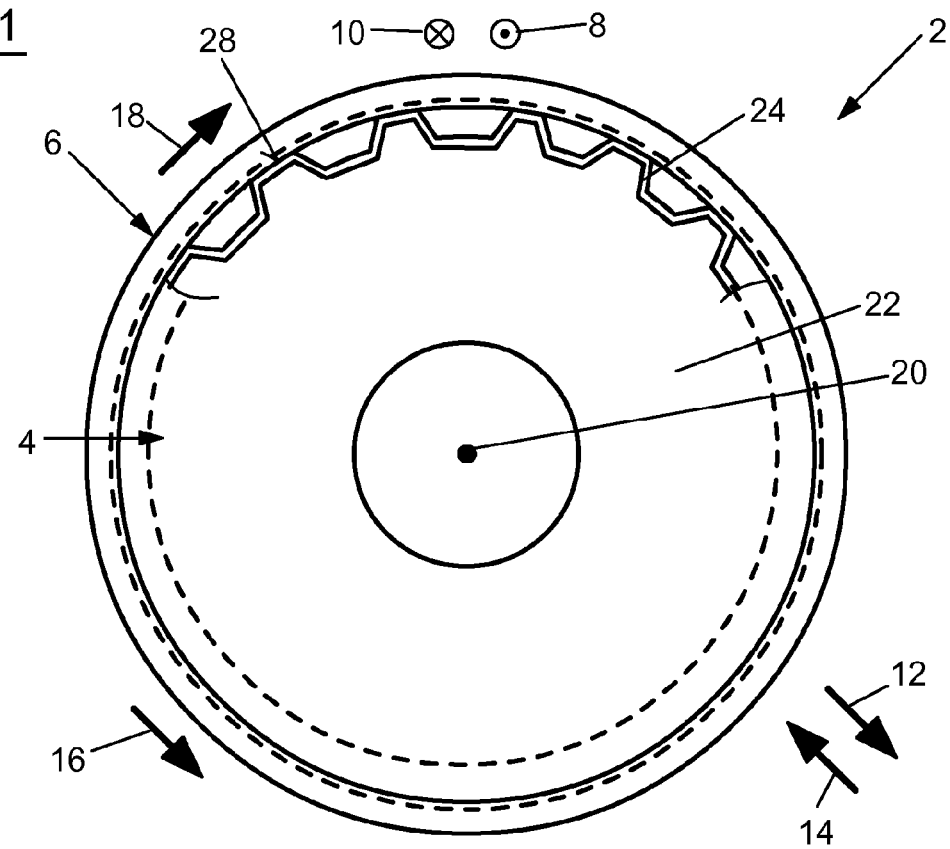

(51) Int. Cl.
  *B21D 53/04*   (2006.01)
  *F16D 55/00*   (2006.01)
(52) U.S. Cl.
  CPC ............. *F16D 2055/0008* (2013.01); *F16D 2250/0023* (2013.01)
(58) Field of Classification Search
  CPC ................. F16D 13/74; F16D 13/72; F16D 2250/00–2250/0092; B21D 53/04
  See application file for complete search history.

(56) References Cited

U.S. PATENT DOCUMENTS

| | | |
|---|---|---|
| 6,158,265 A | 12/2000 | Prater |
| 2004/0035667 A1 | 2/2004 | Prater |
| 2006/0081435 A1* | 4/2006 | Heinrich ................. F16D 13/58 192/70.11 |
| 2009/0229939 A1 | 9/2009 | Gold |
| 2013/0126291 A1 | 5/2013 | Hauck |

OTHER PUBLICATIONS

English language abstract and machine-assisted English translation for EP 2 110 574 extracted from espacenet.com database on Mar. 29, 2017, 26 pages.

\* cited by examiner

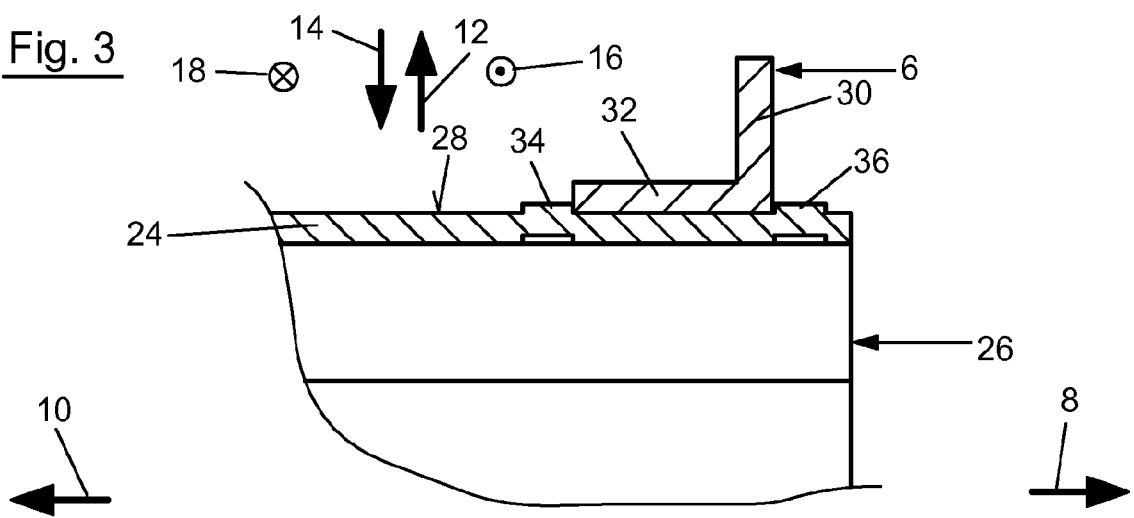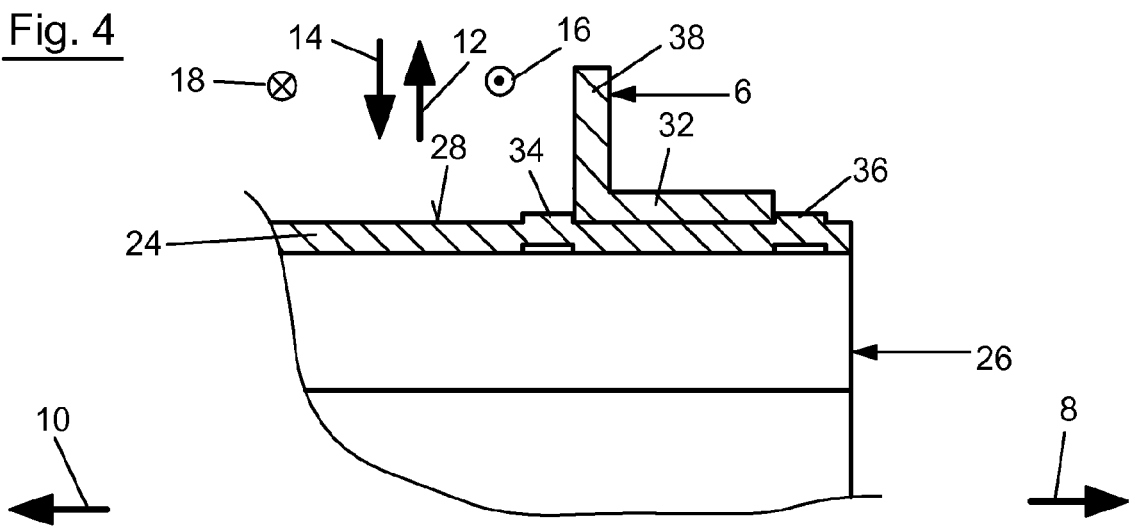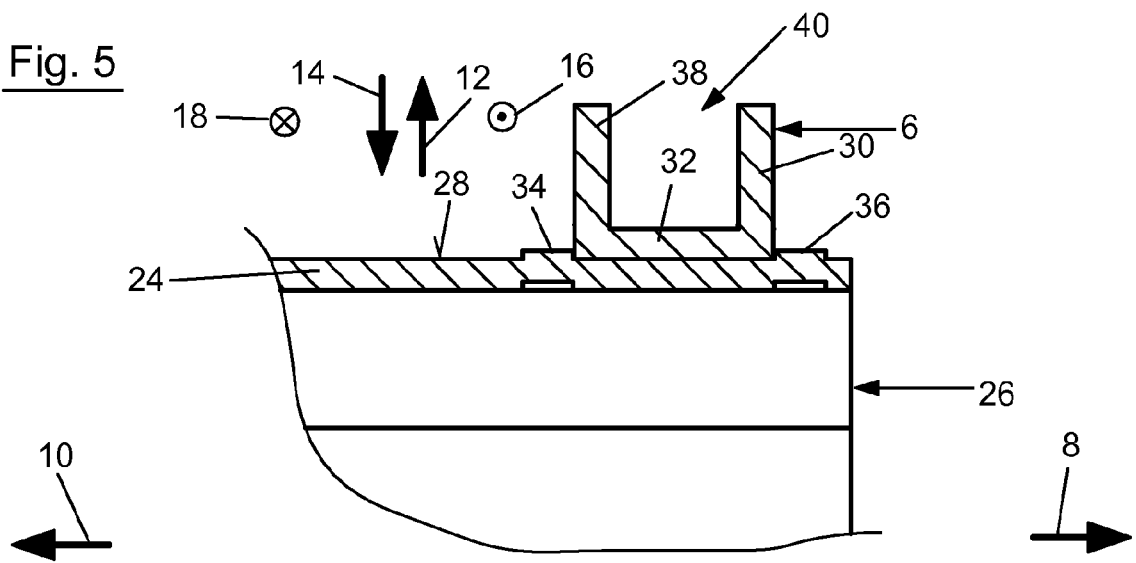

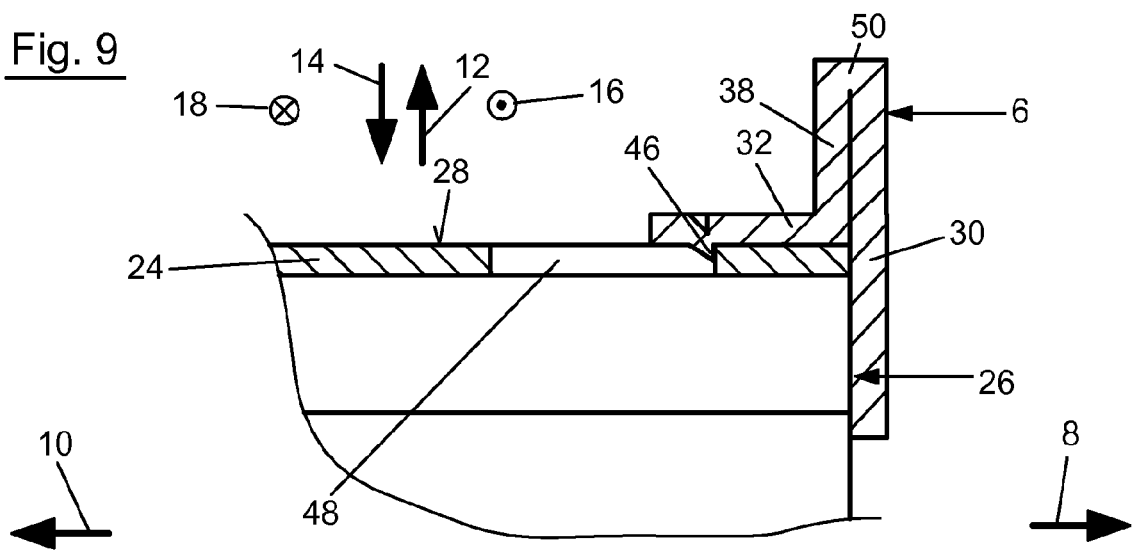
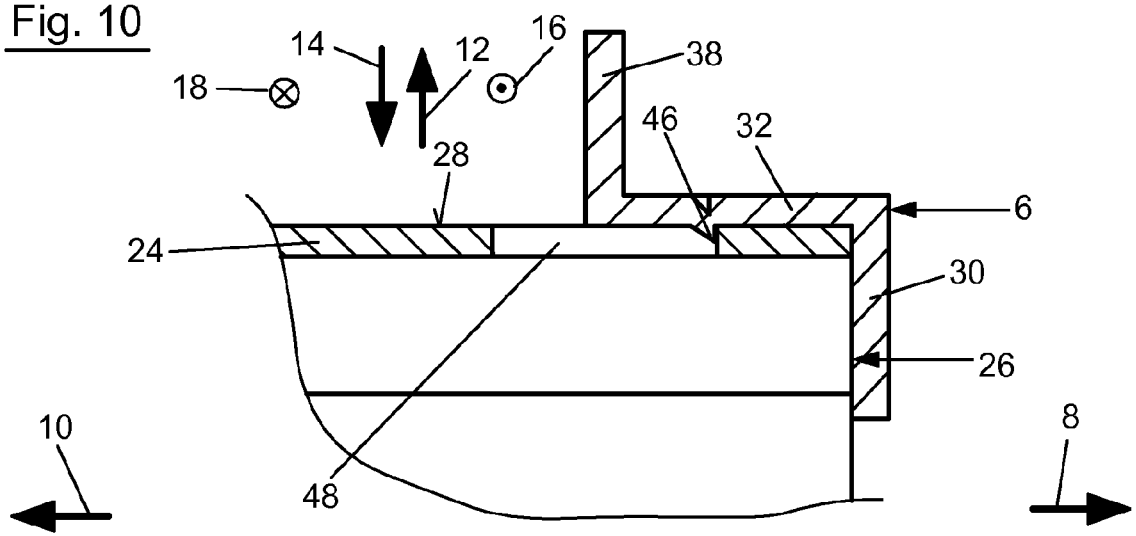
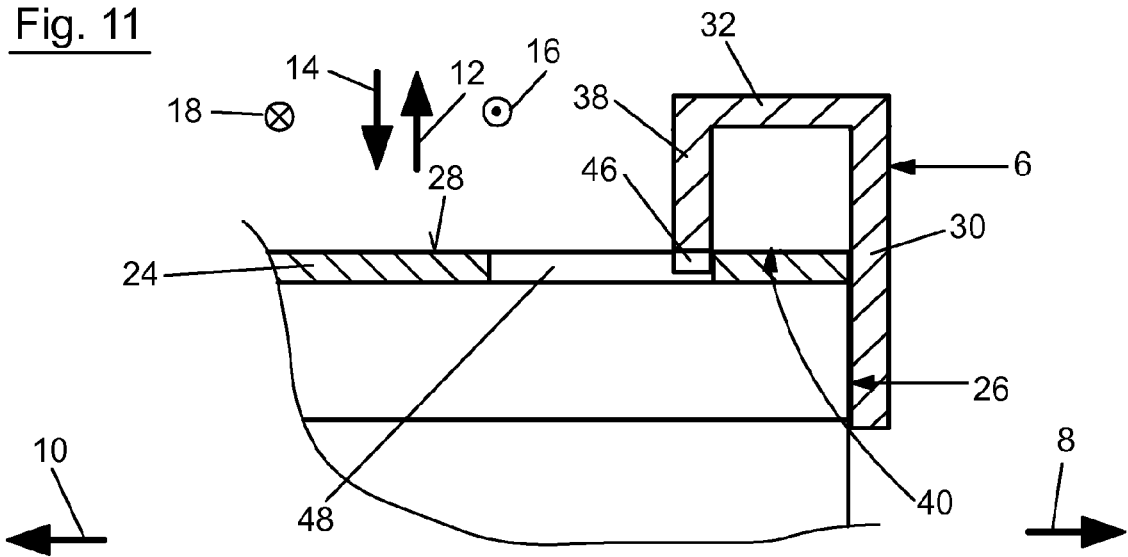

PLATE CARRYING DEVICE, MULTIPLATE CLUTCH OR BRAKE AND METHOD FOR PRODUCING A PLATE CARRYING DEVICE

CROSS-REFERENCE TO RELATED APPLICATIONS

This application is the National Stage of International Patent Application No. PCT/US2015/050075, filed on Sep. 15, 2015, which claims priority to and all the advantages of German Patent Application No. DE 10 2014 014 235.3, filed on Sep. 25, 2014, the content of which is incorporated herein by reference.

The present invention relates to a plate carrying device, in particular for a multiplate clutch or brake, having a plate carrier, which has a tubular section, and a supporting ring, which surrounds the tubular section and on which the tubular section can be supported or is supported outwardly in a radial direction. The present invention furthermore relates to a multiplate clutch or brake having a plate carrying device of this kind and to a method for producing a plate carrying device of this kind.

EP 2 110 574 B1 discloses a plate carrying device for a multiplate clutch. The plate carrying device has a plate carrier which has a tubular section. Moreover, the known plate carrying device comprises a supporting ring which surrounds the tubular section, here the plate carrying section, with the result that the tubular section can be supported or is supported on the supporting ring outwardly in a radial direction. At the same time, the supporting ring of the known plate carrying device has a rectangular cross section designed as a solid cross section, the extent of which is greater in the axial directions than in the radial directions.

The known plate carrying device has proven its worth inasmuch as the supporting ring reliably counteracts outward expansion of the tubular section of the plate carrier in a radial direction at high speeds, thus ensuring uniform torque transmission, irrespective of the speed, and preventing breaking of the plate carrier due to the powerful centrifugal effect at high speeds. However, the known plate carrying device is in need of improvement inasmuch as it has a relatively high weight.

It is therefore an object of the present invention to provide a plate carrying device of the type in question in which, on the one hand, uniform torque transmission is ensured, irrespective of the speed, and breaking of the plate carrier due to the powerful centrifugal effect at high speeds is reliably prevented and which, on the other hand, has a relatively low weight. The present invention is furthermore based on the object of providing a multiplate clutch or brake having a plate carrying device with these advantages. Moreover, the present invention is based on the object of indicating a simple method for producing a plate carrying device of this kind.

This object is achieved by the features indicated in patent claims 1, 13 and 14. Advantageous embodiments of the invention are the subject matter of the dependent claims.

The plate carrying device according to the invention, which is designed, in particular, for a multiplate clutch or multiplate brake, has a plate carrier and a supporting ring. The plate carrier can be an outer plate carrier or inner plate carrier, for example. The plate carrier has a tubular section, which preferably serves to receive plates, i.e. outer plates or inner plates, for conjoint rotation and is thus preferably designed as a "plate carrying section" of the plate carrier. The supporting ring surrounds the tubular section externally, with the result that the tubular section can be supported or is supported on the supporting ring outwardly in a radial direction. In this case, the cross section of the supporting ring has at least one radial leg extending substantially in a radial direction. The radial leg can extend in a straight line, for example, but it is likewise possible for the radial leg to have a profile that deviates from a rectilinear profile, e.g. a bent, curved or kinked profile, and this applies in a corresponding manner to any further radial legs that are present. Since the supporting ring has a radial leg which extends substantially in a radial direction, it can prevent an expansion of the tubular section of the plate carrier due to a powerful centrifugal effect at high speeds in a particularly reliable manner, and therefore the tubular section can be supported or is supported in a particularly reliable manner on the supporting ring outwardly in a radial direction, and breakage of the plate carrier due to said centrifugal effect can be prevented in a particularly reliable manner. Owing to the prevention of expansion of the tubular section of the plate carrier, it is also ensured that uniform torque transmission is guaranteed by the plate carrying device, irrespective of the speed. Moreover, the radial leg extending substantially in a radial direction can have a relatively small extent in an axial direction, and therefore the supporting ring provided is, on the one hand, one on which the tubular section can be supported or is supported in a reliable manner outwardly in a radial direction and, on the other hand, one which has a relatively low weight, with the result that the weight of the entire plate carrying device is reduced.

In a preferred embodiment of the plate carrying device according to the invention, the cross section of the supporting ring furthermore has an axial leg, which extends substantially in an axial direction. In this context, it is also possible to state that the cross section of the supporting ring formed by the at least one radial leg and the at least one axial leg differs from a rectangular, polygonal or circular solid cross section. In this way, the cross section of the supporting ring can have the same dimensions in the radial directions and in the axial directions as the known rectangular, polygonal or circular solid cross sections, while the weight of the supporting ring is less than the weight of the supporting rings in the known plate carrying devices, thus making it possible to obtain a plate carrying device with a lower weight. It is also possible here to refer to a lightweight construction of the supporting ring or of the plate carrying device. By way of example, the axial leg can extend in a straight line, but it is likewise possible for the axial leg to have a profile which differs from a rectilinear profile, e.g. a bent, curved or kinked profile, this applying in a corresponding manner to any further axial legs that are present.

In contrast to the radial leg, the axial leg could be of interrupted design in the circumferential directions in order to save material and to further reduce the weight. In an advantageous embodiment of the plate carrying device according to the invention, however, the axial leg is of continuous design in the circumferential directions in order to improve the supporting effect of the supporting ring in respect of expansion of the tubular section of the plate carrier. The above statements can apply in a corresponding manner to any further axial legs of the cross section of the supporting ring which are present.

In another advantageous embodiment of the plate carrying device according to the invention, the supporting ring has an L-shaped cross section and thus has a structure which is particularly simple and particularly easy to manufacture. Thus, for example, the L-shaped cross section can be composed of the radial leg and the axial leg, which are connected to one another in an appropriate manner, preferably being formed integrally with one another.

In a particularly advantageous embodiment of the plate carrying device according to the invention, the axial leg surrounds the tubular section at least partially or completely, whereas this does not necessarily have to be the case with the radial leg. In this embodiment, it is thus preferred if the radial leg extends inward in a radial direction in front of a free end of the tubular section in order to reduce the size or extent of the plate carrying device outward in a radial direction and therefore to keep the overall radial size of the plate carrying device small.

In a particularly preferred embodiment of the plate carrying device according to the invention, the supporting ring can be supported or is supported in an axial direction on the tubular section by the radial leg, which extends inward in a radial direction in front of the free end of the tubular section. Consequently, the radial leg in this embodiment on the one hand has the function of ensuring a high stiffness of the supporting ring or reliably counteracting expansion of the tubular section due to a powerful centrifugal effect at high speeds and on the other hand has the function of supporting or fixing the supporting ring on the tubular section in at least one of the two axial directions, thus making it possible to dispense with further means or measures for fixing or support, at least in respect of this axial direction. The structure of the plate carrying device and also the fixing thereof is thereby significantly simplified.

In another preferred embodiment of the plate carrying device according to the invention, the cross section of the supporting ring furthermore has a further radial leg extending substantially in a radial direction. This further radial leg can serve for further stiffening of the supporting ring and thus counteract expansion of the tubular section due to the powerful centrifugal effect at high speeds even more reliably.

In another advantageous embodiment of the plate carrying device according to the invention, the supporting ring has the axial leg, on the one hand, and two radial legs, on the other hand, wherein one radial leg, on the one hand, adjoins the axial leg and extends in one radial direction and the other radial leg, on the other hand, adjoins the axial leg and extends in the other radial direction.

In another advantageous embodiment of the plate carrying device according to the invention, the supporting ring has a U-shaped or semicircular cross section. Thus, for example, two axial legs and one radial leg can be provided, wherein the open side of the U-shaped or semicircular cross section can face in one of the axial directions. However, it is preferred in this context if the open side of the U-shaped or semicircular cross section faces inward or outward in a radial direction. Since the open side of the U-shaped or semicircular cross section faces inward or outward in a radial direction, a cross section with two radial legs and one axial leg is accordingly provided which counteracts expansion of the tubular section due to a powerful centrifugal effect at high speeds in a particularly reliable manner.

In order to ensure reliable, in particular captive, arrangement of the supporting ring on the tubular section of the plate carrier, the supporting ring in another preferred embodiment of the plate carrying device according to the invention can be supported or is supported in at least one axial direction on the tubular section. It is preferred here if support is provided in both axial directions on the tubular section. It is furthermore preferred if the support is provided positively and/or nonpositively, with support preferably being based on positive engagement, supplemented if appropriate by support through nonpositive engagement by the supporting ring being preloaded inward in a radial direction against the tubular section of the plate carrier, for example, with the result that a frictional force in both axial directions is obtained between the supporting ring and the tubular section of the plate carrier.

In order to achieve the abovementioned support of the supporting ring in at least one of the axial directions or both axial directions, it is possible, for example, for projecting protrusions to be provided on the tubular section of the plate carrier, with the result that the supporting ring can be supported or is supported positively in at least one of the axial directions or in both axial directions on the tubular section. As an alternative or in addition, in another advantageous embodiment of the plate carrying device according to the invention, at least one protrusion, which projects in a radial direction and extends into an aperture or depression in the tubular section, thereby supporting the supporting ring in at least one of the axial directions, is provided on the supporting ring. In principle, preference is given here to a depression in the tubular section since the cohesion of the tubular section in the region of the depression is not thereby interrupted. However, if the tubular section has openings for centrifugally driven oil, which are intended to allow centrifugally driven oil to pass through the tubular section and are preferably designed as openings for centrifugally driven oil of elongate design in the axial directions, it is preferred if the at least one projecting protrusion on the supporting ring extends in at least one of the axial directions into the aperture in the form of the opening for centrifugally driven oil in the tubular section, thereby supporting the supporting ring, with the result that there is a widening of the function of the opening for centrifugally driven oil and no additional aperture has to be produced in the tubular section independently of the opening for centrifugally driven oil to receive the projecting protrusion, thus simplifying manufacture and the structure of the plate carrying device and increasing the stability of the plate carrier. In this embodiment, it is furthermore preferred if at least two or three projecting protrusions spaced apart, if appropriate uniformly, in the circumferential directions are provided in order to effect reliable fixing of the supporting ring on the tubular section of the plate carrier in at least one of the two axial directions. In principle, the single projecting protrusion on the supporting ring can effect both support in one axial direction and support in the other axial direction on the tubular section of the plate carrier. As an alternative, however, it is also possible for further projecting protrusions to be provided for support in the opposite axial direction. Moreover, support in the opposite axial direction can also be accomplished in some other way, e.g.—as already indicated above—by means of the radial leg extending inward in a radial direction in front of the free end of the tubular section or by means of a projecting protrusion, already mentioned, on the tubular section of the plate carrier.

As already indicated above, the supporting ring in a particularly simple embodiment of the plate carrying device according to the invention can be supported or is supported in one axial direction by means of the at least one projecting protrusion on the supporting ring and in the opposite axial direction by means of the radial leg, if appropriate one of the radial legs, on the tubular section.

As already mentioned above, the radial leg or radial legs of the cross section of the supporting ring extends/extend substantially in a radial direction. In an advantageous embodiment of the plate carrying device according to the invention, this is to be taken to mean that the radial leg and also any further radial legs that are present slopes/slope by less than 45° relative to a radial plane. It is preferred here if the radial leg or legs slopes/slope by less than 10° or 5° relative to a radial plane, wherein the radial leg or legs particularly preferably extends/extend in a radial plane.

As already mentioned above, the axial leg of the cross section of the supporting ring slopes substantially in an axial direction. In an advantageous embodiment of the plate carrying device according to the invention, this is to be taken to mean that the axial leg, if appropriate also further axial legs that are present, slopes/slope by less than 45°, preferably less than 10° or 5°, relative to a longitudinal axis of the plate carrying device, wherein it is particularly preferred if the axial leg or axial legs extends/extend parallel to the longitudinal axis.

In order to be able to counteract outward expansion of the tubular section of the plate carrier in a radial direction in a particularly reliable manner by means of the radial leg extending substantially in a radial direction, the radial leg, if appropriate at least one of the radial legs or all the radial legs, is/are of continuous design in the circumferential directions in another preferred embodiment of the plate carrying device according to the invention.

In principle, the supporting ring could be composed of any material and could be manufactured in any way as long as it had the necessary strength and stiffness required to support the tubular section of the plate carrier outwardly in a radial direction. However, to achieve particularly simple manufacture and a uniformly high strength and stiffness of the supporting ring, the supporting ring is designed as a sheet-metal part, preferably as a formed sheet-metal part, particularly preferably as a deep-drawn part, in another particularly preferred embodiment of the plate carrying device according to the invention. The formed sheet-metal part is preferably a formed sheet-metal part in the form of an annular disk.

In principle, the supporting ring could be a multipiece or multipart supporting ring, wherein the individual parts are joined together to form the supporting ring by way of appropriate joints. In a preferred embodiment of the plate carrying device according to the invention, however, the supporting ring is of integral design in order to avoid weak points in the region of the joints of a multipiece or multipart supporting ring.

In another advantageous embodiment of the plate carrying device according to the invention, the supporting ring is a supporting ring of closed design in the circumferential directions.

In another advantageous embodiment of the plate carrying device according to the invention, the tubular section, which can be supported or is supported on the supporting ring outwardly in a radial direction, is a plate carrying section of the plate carrier. Since the plate carrying section must generally be deformed beforehand in order to have a contour which enables plates to be received, the plate carrying section has a particularly strong tendency to expand or break when subject to powerful centrifugal effects. Owing to the arrangement of the supporting ring in a position surrounding the plate carrying section, the supporting ring can suppress the expansion of the tubular section in the form of the plate carrying section in a particularly effective manner.

In another advantageous embodiment of the plate carrying device according to the invention, the plate carrier is an outer plate carrier or an inner plate carrier. Since the risk of expansion due to the effective centrifugal force is particularly great in the case of an outer plate carrier, which generally has a particularly long tubular section and with which no radially outer components on which the tubular section could be supported are associated, the design of the plate carrier as an outer plate carrier is preferred. In contrast, the design of the plate carrier as an inner plate carrier with such a supporting ring is also advantageous. Although the tubular section of an inner plate carrier is generally of shorter design and, furthermore, the inner plates arranged radially on the outside on the inner plate carrier can already counteract expansion of the tubular section, expansion of the tubular section can then lead to the axial mobility of the inner plates being limited. Given this background situation, it is preferred that the supporting ring on the inner plate carrier is not designed as a torque-transmitting friction partner, particularly preferably not at all as a friction partner. This means, for example, that the supporting ring in this alternative embodiment is not designed as an inner plate or friction plate which serves for torque transmission and that preferably there is no friction at all between the supporting ring and the associated counterplates or outer plates. In this way, the inner plates, on the one hand, and the supporting ring, on the other hand, can be matched precisely to their intended function, namely torque transmission, on the one hand, and prevention of expansion of the tubular section, on the other hand.

The multiplate clutch or multiplate brake according to the invention has a plate carrying device of the type according to the invention. The multiplate clutch can be a dual clutch, for example, i.e. a parallel or concentric dual clutch. As regards the advantages of the multiplate clutch or brake, reference may be made to the above-described advantages of the plate carrying device according to the invention, which apply in a corresponding manner to the multiplate clutch or brake.

In a preferred embodiment of the multiplate clutch or brake according to the invention, no driving disk is provided for the plate carrier. In the case of multiplate clutches having a driving disk, the driving disk is generally in rotary driving connection with the free end of the tubular section of the plate carrier and, in this way, can likewise counteract expansion of the tubular section. However, if no driving disk is provided, the tubular section has a particularly strong tendency to expand in a radial direction, and therefore the supporting ring can be used to particularly great effect on a multiplate clutch or brake without a driving disk.

In another advantageous embodiment of the multiplate clutch or brake according to the invention, a driving disk in rotary driving connection with the plate carrier, if appropriate with the free end of the tubular section of the plate carrier, is provided but, in this case, the supporting ring is formed separately from the driving disk. Since the supporting ring is formed both separately from the plate carrier and separately from the driving disk, the known components can be of particularly simple construction. Moreover, the stated components can be matched to their intended function separately from one another without the need to be matched especially to the other component. Thus, in particular, close tolerances do not have to be observed, as would be the case, for example, with a supporting ring formed integrally with the driving disk.

The method according to the invention for producing a plate carrying device of the type according to the invention has the method steps described in detail below. Thus, first of all, a sheet-metal part in the form of an annular disk is prepared. This can have been punched out of a sheet-metal strip or a sheet of metal plate, for example, to enable it to be prepared. The sheet-metal part in the form of an annular disk is then formed to produce a supporting ring with a cross section which has at least one radial leg extending substantially in a radial direction. Here, forming is preferably accomplished by bending and/or deep drawing the sheet-metal part in the form of an annular disk. After the preparation of the supporting ring, it is mounted on the tubular section of a prepared plate carrier, with the result that the tubular section can be supported or is supported on the supporting ring outwardly in a radial direction. Here, the mounting of the supporting ring on the tubular section is preferably accomplished by a process involving preloading the supporting ring inward against the tubular section of the plate carrier in a radial direction. It may be mentioned at this point that the preparation of the sheet-metal part in the form of an annular disk can be accomplished by punching, for example, and also at least partially or completely at the same time as the forming of the sheet-metal part in the form of an annular disk.

Figure 2:
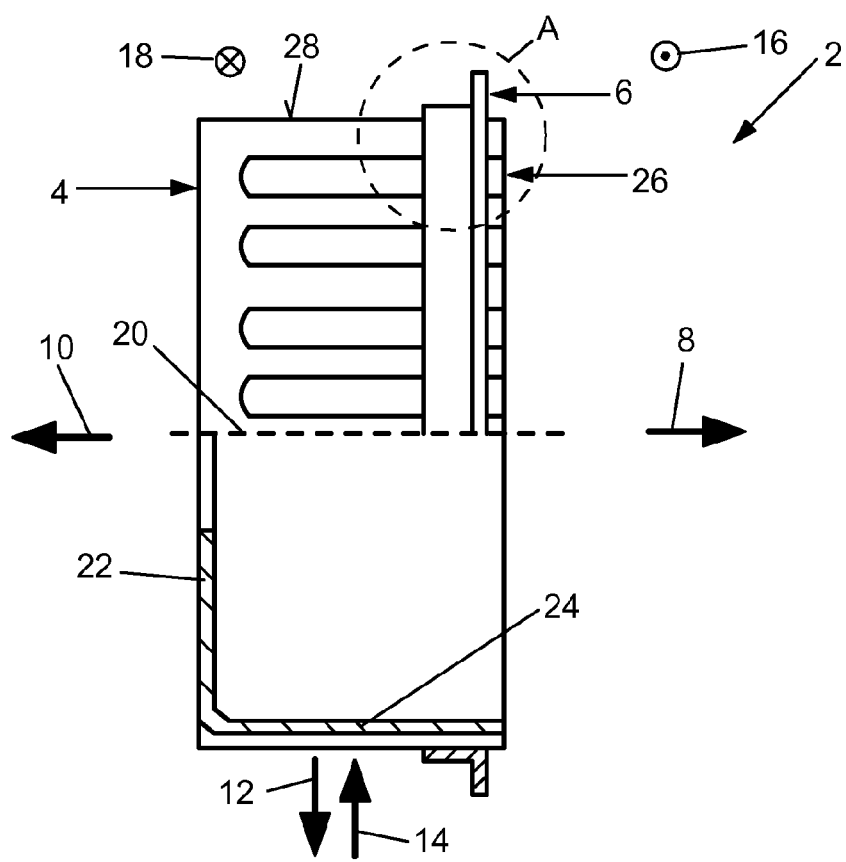
Figure 6:
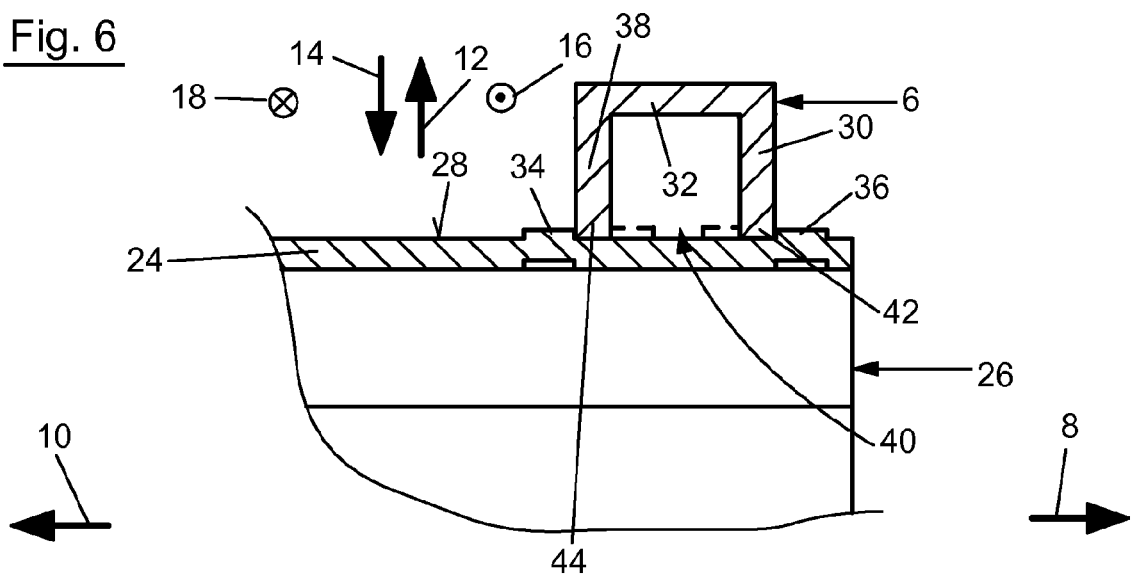
Figure 7:
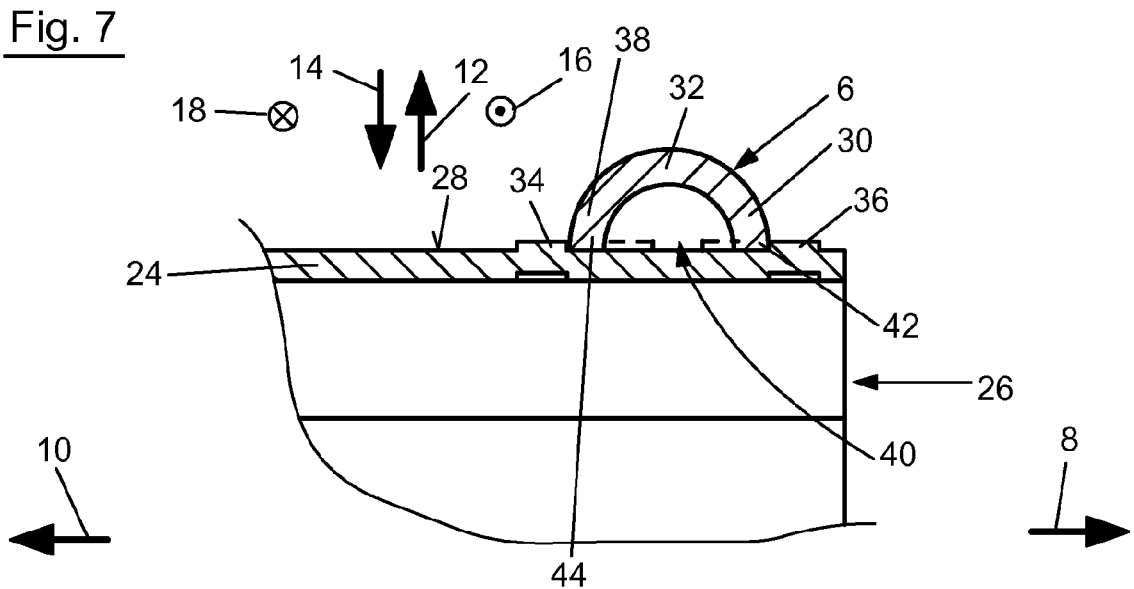
Figure 8:
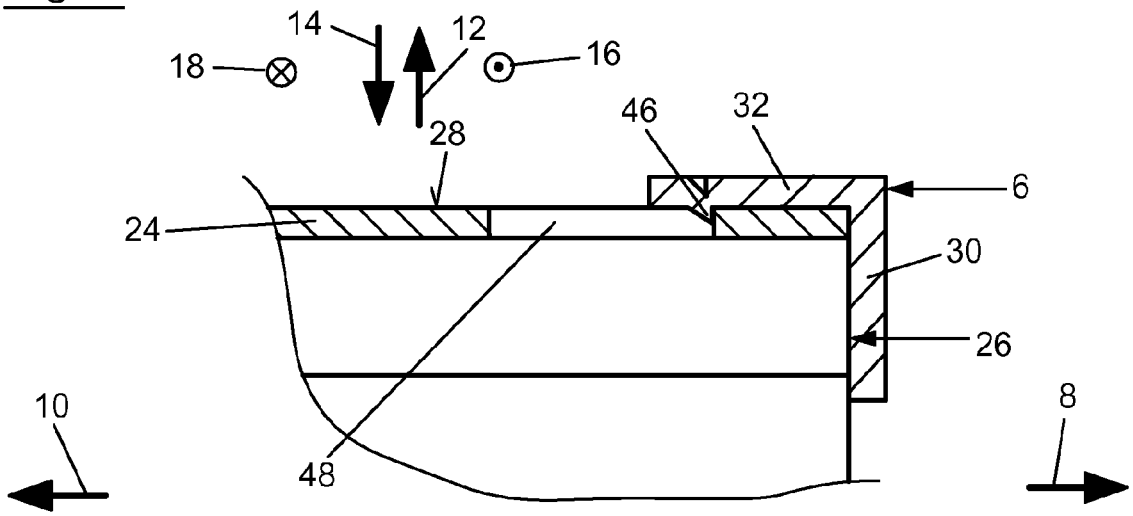

The invention is explained in greater detail below by means of illustrative embodiments with reference to the attached drawings, in which:

FIG. 1 shows a front view of one embodiment of the plate carrying device according to the invention, FIG. 2 shows a side view of the plate carrying device in FIG. 1 in partial section, FIG. 3 shows the detail A in FIG. 2 in section with a first variant embodiment of the supporting ring, FIG. 4 shows the detail A in FIG. 2 in section with a second variant embodiment of the supporting ring, FIG. 5 shows the detail A in FIG. 2 in section with a third variant embodiment of the supporting ring, FIG. 6 shows the detail A in FIG. 2 in section with a fourth variant embodiment of the supporting ring, FIG. 7 shows the detail A in FIG. 2 in section with a fifth variant ring, FIG. 8 shows the detail A in FIG. 2 in section with a sixth variant embodiment of the supporting ring, FIG. 9 shows the detail A in FIG. 2 in section with a seventh variant embodiment of the supporting ring, FIG. 10 shows the detail A in FIG. 2 in section with a eighth variant embodiment of the supporting ring, and FIG. 11 shows the detail A in FIG. 2 in section with a ninth variant embodiment of the supporting ring.

FIGS. 1 and 2 show one embodiment of the plate carrying device 2 according to the invention. The plate carrying device 2 can be used in a multiplate clutch or multiplate brake, for example. The plate carrying device 2 is composed essentially of a plate carrier 4 and of a supporting ring 6, which is initially formed separately from the plate carrier 4 and has been mounted or fixed on the plate carrier 4. The mutually opposite axial directions 8, 10, the mutually opposite radial directions 12, 14 and the mutually opposite circumferential directions 16, 18 of the plate carrying device 2 or of the plate carrier 4 thereof and of the supporting ring 6 are indicated by means of corresponding arrows, wherein the plate carrying device 2 and thus also the plate carrier 4 and the supporting ring 6 have a longitudinal axis 20 which extends in the axial directions 8, 10 and can also be referred to as an axis of rotation of the plate carrying device 2.

The plate carrier 4 is of substantially pot-shaped design. Thus, the plate carrier 4 has a supporting section 22 extending in radial directions 12, 14, which can be connected for conjoint rotation to a hub (not shown specifically) on the inside in radial direction 14, for example. Adjoining the supporting section 22, which is substantially in the form of an annular disk, on the outside in radial direction 12 is a tubular section 24, which extends in axial direction 8 from the end of the supporting section 22 which faces outward in radial direction 12 to a free end 26 of the tubular section 24. In the embodiment shown, the tubular section 24 is designed as a plate carrying section for plates (not shown specifically), i.e. inner or outer plates, preferably outer plates. For this purpose, the tubular section 24 has a rotary driving contour, with which a corresponding rotary driving contour on the plates can be brought into rotary driving engagement. In the embodiment shown, the rotary driving contour is produced by the tubular section 24 being formed substantially by a wall extending in a corrugated or stepped manner in the circumferential directions 16, 18.

The supporting ring 6 surrounds the tubular section 24 in the form of the plate carrying section of the plate carrier 4 on the outside in radial direction 12, with the result that the supporting ring 6 is supported inwardly in radial direction 14 on the outer side 28, which faces outward in radial direction 12. In this case, however, the supporting ring 6 is not arranged centrally with respect to the axial directions 8, 10 on the tubular section 24 but instead is arranged offset toward the free end of the tubular section 24 or plate carrying section, said end facing in axial direction 8, as can be seen especially from FIG. 2. The supporting ring 6 is suitable for supporting the tubular section 24 in radial direction 12. In other words, the supporting ring 6 counteracts expansion of the tubular section 24 outward in radial direction 12 due to centrifugal force. In this case, the supporting ring 6 is preferably arranged on the tubular section 24 with the supporting ring 6 being preloaded inward in radial direction 14 against the outer side 28.

Before further details are given of the various variant embodiments of the supporting ring 6 which are shown in FIGS. 3 to 11, those features of the supporting ring 6 which apply to all the variant embodiments of the supporting ring 6 which are shown in FIGS. 3 to 11 will first of all be described below. Thus, the supporting ring 6 is a supporting ring 6 which is of closed design in the circumferential directions 16, 18 and furthermore is of integral design. The supporting ring 6 is also designed as a sheet-metal part, preferably as a formed sheet-metal part, particularly preferably as a deep drawn part. As part of the production of the plate carrying device 2, a sheet-metal part in the form of an annular disk and the plate carrier 4 are prepared first. The sheet-metal part in the form of an annular disk can have been punched out of a sheet-metal strip or a sheet-metal plate, for example. Subsequently or at least partially simultaneously with the preparation of the sheet-metal part in the form of an annular disk, said sheet-metal part is formed to produce the supporting ring 6, wherein forming is preferably accomplished by bending and/or deep drawing. In this case, forming involves producing a supporting ring 6 with a cross section which has at least one radial leg extending substantially in a radial direction 12, 14, as described in detail below with reference to the various variant embodiments of the supporting ring 6 in FIGS. 3 to 11. Following this, the supporting ring 6 is mounted on the tubular section 24 of the plate carrier 4 in order to assume its desired position according to FIGS. 1 and 2, with the result that the tubular section 24 in the form of the plate carrying section can be supported or is supported on the supporting ring 6 outwardly in radial direction 12. Here, as already mentioned above, mounting preferably involves preloading the supporting ring 6 inward in radial direction 14 against the outer side 28 of the tubular section 24 in the form of the plate carrying section of the plate carrier 4. If the plate carrying device 2 is provided within a multiplate clutch or brake and is provided with a driving disk for the plate carrier 4 which is in rotary driving engagement in the region of the free end 26 with the tubular section 24 in the form of the plate carrying section of the plate carrier 4, the supporting ring 6 is formed separately from the driving disk and thus is not an integral component of the driving disk. Moreover, in this case the supporting ring 6 should not be arranged in the torque flow or torque transmission path of the multiplate clutch or multiplate brake. The plate carrier 4 can furthermore be an outer plate carrier or inner plate carrier. If the plate carrier 4 is supposed to act as an inner plate carrier, the supporting ring 6 is preferably not designed as a torque-transmitting friction partner, preferably not at all as a friction partner, of the multiplate clutch or brake, nor is it designed for this purpose. Moreover, in all the variant embodiments shown in FIGS. 3 to 11, the supporting ring 6 can be supported or is supported in at least one axial direction 8; 10, in this case in both axial directions 8, 10, on the tubular section 24 in the form of the plate carrying section, thus ensuring that the supporting ring 6 is fixed on the tubular section 24 in both axial directions 8, 10. In all the variant embodiments shown, this capacity for support in the axial directions 8, 10 is achieved by positive engagement, wherein a nonpositive component based on frictional forces acting in the axial directions 8, 10 is also involved owing to the preloading of the supporting ring 6 inward in radial direction 14 against the outer side 28 of the tubular section 24 of the plate carrier 4. However, this is not necessarily required.

Different variant embodiments of the supporting ring 6 and of the arrangement thereof on the tubular section 24 of the plate carrier 4 are described below with reference to FIGS. 3 to 11, wherein the previous statements apply equally to all the variant embodiments of the supporting ring 6.

FIG. 3 shows a first variant embodiment of the supporting ring 6, wherein this first variant embodiment has already been shown by way of example in FIGS. 1 and 2. As can be seen from FIG. 3, the cross section of the supporting ring 6 has a radial leg 30 which extends substantially in a radial direction 12, 14. Here, a radial leg 30 of the cross section of the supporting ring 6 which extends substantially in a radial direction 12, 14 is preferably to be taken to mean a leg of the cross section of the supporting ring 6 which slopes by less than 45°, preferably less than 10° or 5°, relative to a radial plane defined by the radial directions 12, 14, wherein it is particularly preferred if the leg forming the respective radial leg extends in a radial plane defined by the radial directions 12, 14, with the slope angle being accordingly 0°. This applies both to the variant embodiment shown in FIG. 3 and to the radial legs (described in detail below) shown in FIGS. 4 to 11.

Adjoining the radial leg 30 toward the inside in radial direction 14 there is an axial leg 32 extending substantially in an axial direction 8, 10. Here, an axial leg of the cross section of the supporting ring 6 which extends substantially in an axial direction 8, 10 is preferably to be taken to mean a leg of the cross section of the supporting ring 6 which slopes by less than 45°, preferably less than 10° or 5°, relative to the longitudinal axis 20, wherein the leg of the cross section of the supporting ring 6 which forms the axial leg particularly preferably extends parallel to the longitudinal axis 20 in the axial directions 8, 10, with the slope angle relative to the longitudinal axis 20 accordingly being 0°, as shown in FIG. 3. This applies in a corresponding manner to the axial legs (described in greater detail below) shown in FIGS. 4 to 11.

In the first variant embodiment shown in FIG. 3, the side of the axial leg 32 which faces inward in radial direction 14 is supported in radial direction 14 on the outer side 28 of the tubular section 24 of the plate carrier 4, said outer side facing in radial direction 12. At least the single radial leg 30 is of continuous design in the circumferential directions 16, 18, and consequently has no interruptions in the circumferential directions 16, 18. In contrast, the axial leg 32 can have interruptions in the circumferential directions 16, 18, even if it is preferred in this case too to make the axial leg 32 continuous in the circumferential directions 16, 18 in order to improve the supporting effect provided by the supporting ring 6. In the variant embodiment shown in FIG. 3, the positive support of the supporting ring 6 in axial direction 10 is provided by means of at least one protrusion 34, which projects outward in radial direction 12 beyond the outer side 28 of the tubular section 24 and is preferably formed integrally with the tubular section 24 and/or has been produced by stamping or forming the tubular section 24 in this region. Here, the forming or stamping is preferably accomplished without the projecting protrusion 34 losing its material cohesion with the surrounding region of the tubular section 24 in the circumferential directions 16, 18 or in the axial directions 8, 10. In this case, two or more projecting protrusions 34 are preferably provided on the outer side 28 of the tubular section 24, these particularly preferably being spaced apart uniformly from one another in the circumferential directions 16, 18. In the opposite axial direction 8, the supporting ring 6 is likewise supported on the tubular section 24 by means of a projecting protrusion 36, which is once again formed integrally with the tubular section 24 and/or has been produced by stamping or forming the tubular section 24 in this region. Here too, the forming for the production of the projecting protrusion 36 is preferably performed in such a way that the material cohesion between the projecting protrusion 36 and the material of the tubular section 24 surrounding the projecting protrusion 36 is maintained in the circumferential directions 16, 18 and the axial directions 8, 10. Here too, two or more projecting protrusions 36 spaced apart from one another in the circumferential directions 16, 18 are preferably provided on the outer side 28 of the tubular section 24, wherein said protrusions are preferably spaced apart uniformly from one another in the circumferential directions 16, 18. Moreover, it can be seen from FIG. 3 that both the radial leg 30 and the axial leg 32 surround the tubular section 24 on the outside. It can furthermore be seen in FIG. 3 that the supporting ring 6 has an L-shaped cross section.

A second variant embodiment of the supporting ring 6 is described below with reference to FIG. 4, said variant corresponding substantially to the first variant embodiment shown in FIG. 3, and therefore only the differences will be explored below, the same reference signs are used for the same or similar parts and the above description otherwise applies accordingly.

In the case of the second variant embodiment shown in FIG. 4 too, the supporting ring 6 has an L-shaped cross section. However, the radial leg 30 adjoining the axial leg 32 in an axial direction 8 is dispensed with in favor of radial leg 38. Radial leg 38 adjoins that end of the axial leg 32 which faces in axial direction 10 and extends substantially outward in radial direction 12. Radial leg 38 as the single radial leg of the L-shaped cross section of the supporting ring 6 shown in FIG. 4 is also of continuous design in the circumferential directions 16, 18, and it therefore has no interruptions.

FIG. 5 shows a third variant embodiment of the supporting ring 6, wherein the third variant embodiment corresponds substantially to the variant embodiments shown in FIGS. 3 and 4, and therefore only the differences will be explored below, the same reference signs are used for the same or similar parts and the above description otherwise applies accordingly.

As can be seen from FIG. 5, the supporting ring 6 according to the third variant embodiment represents a combination of the first two variant embodiments shown in FIGS. 3 and 4, and therefore the cross section of the supporting ring 6 has both radial leg 30, which adjoins the axial leg 32 in axial direction 8, and radial leg 38, which adjoins the axial leg 32 in axial direction 10. Consequently, a supporting ring 6 with a U-shaped cross section is thereby created, wherein the open side 40 of the U-shaped cross section faces outward in radial direction 12 and thus faces away from the tubular section 24, while the axial section 32—as already explained above—faces the tubular section 24.

FIG. 6 shows a fourth variant embodiments of the supporting ring 6, which corresponds substantially to the variant embodiment shown in FIG. 5, and therefore only the differences will be explored below, the same reference signs are used for the same or similar parts and the above description otherwise applies accordingly.

In the case of the fourth variant embodiment shown in FIG. 6, the supporting ring 6 has a substantially U-shaped cross section. However, in contrast to the variant embodiment shown in FIG. 5, the open side 40 of the U-shaped cross section faces inward in radial direction 14 and thus faces the tubular section 24. The axial leg 32, in contrast, is arranged on the outside in radial direction 12 and thus faces away from the tubular section 24, wherein radial leg 30 adjoins the axial leg 32 in axial direction 8 and extends inward in radial direction 14 from the axial leg 32, while radial leg 38 adjoins the axial leg 32 in axial direction 10 and extends inward in radial direction 14 in the direction of the tubular section 24. Consequently, the supporting ring 6 is supported on the outer side 28 of the tubular section 24 inwardly in radial direction 14 via the end sections 42, 44 of the radial legs 30, 38 which faces away from the axial leg 32. In this case, end section 42 of radial leg 30 is associated with projecting protrusion 36, while end section 44 of radial leg 38 is associated with projecting protrusion 34 in order to provide support for the supporting ring 6 on the tubular section 24 in the axial directions 8, 10. However, it should be noted at this point that, in principle, it is also possible—if not entirely desirable—to associate both projecting protrusion 34 and projecting protrusion 36 to just one of the end sections 42, 44 in order to provide support for the supporting ring 6 on the tubular section 24 in the axial directions 8, 10, as indicated in FIG. 6 by means of the illustration in dashed lines. Moreover, it is possible to associate two projecting protrusions on the tubular section 24 with each of the two end sections 42, 44.

FIG. 7 shows a fifth variant embodiments of the supporting ring 6 which corresponds substantially to the variant embodiment shown in FIG. 6, and therefore only the differences will be explored below, the same reference signs are used for the same or similar parts and the above description otherwise applies accordingly.

While an abrupt, angular and/or non-continuous transition between the radial legs 30, 38, on the one hand, and the axial leg 32, on the other, is provided in the variant embodiment of the supporting ring 6 shown in FIG. 6, these transitions are of smooth, curved and/or continuous design in the variant embodiment of the supporting ring 6 shown in FIG. 7. Thus—as shown in FIG. 7—the cross section of the supporting ring 6 can be of semicircular design with continuous or curved transitions between the axial leg 32, on the one hand, and the radial legs 30, 38, on the other, for example. It can also be seen from FIG. 7 that the radial legs 30 and 38 do not have to form a constant slope angle relative to a radial plane over their entire length, something that applies in a corresponding manner to the slope angle of the axial leg 32 relative to the longitudinal axis 20 of the plate carrying device 2.

In the above-described variant embodiments shown in FIGS. 5 to 7, in which the cross section of the supporting ring 6 has two radial legs 30, 38, at least one of the radial legs 30, 38 should be of continuous design in the circumferential directions 16, 18, while the other radial leg 38; 30 can be of interrupted design in the circumferential directions 16, 18. This can be advantageous, particularly in the variant embodiments shown in FIGS. 6 and 7, in which the open side 40 of the U-shaped cross section faces inward in radial direction 14 and thus faces the tubular section 24. In this case, that radial leg 30 or 38, in particular, which is associated with both projecting protrusions 34, 36 should be of interrupted design in the circumferential directions 16, 18, as indicated by means of the dashed line in FIGS. 6 and 7 in order to simplify the mounting of the supporting ring 6 on the tubular section 24 of the plates carrier 4. However, it is likewise possible where there are two radial legs 30, 38 present, to provide both radial legs 30, 38 with interruptions in the circumferential directions 16, 18, wherein, in this case, one radial leg 30, 38 should overlap the interruption in the other radial leg 38, 30 when viewed in the axial directions 8, 10. Irrespective of the above statements, however, it is preferred if both radial leg 30 and radial leg 38 are of continuous design in the circumferential directions 16, 18 in order to achieve a particularly high stiffness and strength of the supporting ring 6 and hence to enable expansion of the tubular section 24 at high speeds of the plate carrying device 2 to be counteracted in a particularly reliable manner. In conclusion, it may be noted that both the two radial legs 30, 38 and the axial leg 32 surround the tubular section 24 in the variant embodiments shown in FIGS. 5 to 7.

FIG. 8 shows a sixth variant embodiment of the supporting ring 6, which corresponds substantially to the variant embodiments shown in FIGS. 3 to 7, and therefore only the differences will be explored below, the same reference signs are used for the same or similar parts and the above description otherwise applies accordingly.

As is already the case with the variant embodiments shown in FIGS. 3 and 5, the variant embodiment shown in FIG. 8 also has a supporting ring 6 with an axial leg 32 which rests by means of its side facing inward in radial direction 14 on the outer side 28 of the tubular section 24. In axial direction 8, a radial leg 30 adjoins the end of the axial leg 32 which faces in axial direction 8, wherein radial leg 30 extends inward in radial direction 14 from the axial leg 32 in front of the free end 26 of the tubular section 24. The axial leg 32 thus surrounds the tubular section 24, while radial leg 30 is arranged behind the tubular section 24 or the free end 26 of the tubular section 24 in axial direction 8. Consequently, the supporting ring 6 can be supported or is supported in axial direction 10 on the tubular section 24 or the free end 26 of the tubular section 24 via the radial leg 30 extending inward in radial direction 14.

In order to achieve fixing or support of the supporting ring 6 on the tubular section 24 in axial direction 8 as well, at least one protrusion 46 projecting in radial direction 14 is provided on the supporting ring 6, said protrusion extending into an aperture 48 in the tubular section 24, thereby supporting the supporting ring 6 in axial direction 8. In concrete terms, in the variant embodiment shown in FIG. 8 the protrusion 46 projecting inward in radial direction 14 is provided on the axial leg 32, wherein the projecting protrusion 46 has preferably been produced by forming or stamping the axial leg 32 in this region, particularly preferably while maintaining the material cohesion between the projecting protrusion 46 and the region of the axial leg 32 surrounding the projecting protrusion 46, both in the axial directions 8, 10 and in the circumferential directions 16, 18. In contrast, the aperture 48 is formed by an opening for centrifugally driven oil, which serves to allow cooling and/or lubricating oil to pass through the wall of the tubular section 24. In this case, the aperture 48 in the form of the opening for centrifugally driven oil is designed as an opening for centrifugally driven oil which is elongated in the axial directions 8, 10. Here, the use of the opening for centrifugally driven oil as an aperture 48 has the advantage that an aperture which is already present in any case is used to support the supporting ring 6 in axial direction 8, with the result that no additional aperture has to be produced during the manufacture of the plate carrier 4.

On the contrary, the aperture 48 in the form of the opening for centrifugally driven oil has a dual function which simplifies the structure and manufacture. As an alternative, however, it is also possible to provide a depression in the outer side 28 of the tubular section 24, into which the projecting protrusion 46 extends.

Even if the variant embodiment shown in FIG. 8 is to be preferred as regards manufacture and structure, it should nevertheless be mentioned that it is also possible, as an alternative, to provide a protrusion projecting outward in radial direction 12 on the tubular section 24 of the plate carrier 4, said protrusion extending into an aperture or depression in the axial leg 32, thereby supporting the supporting ring 6.

In summary, it may thus be stated as regards the variant embodiment shown in FIG. 8 that the supporting ring 6 can be supported or is supported on the tubular section 24 of the plate carrier 4 via the at least one projecting protrusion 46 in axial direction 8 and via radial leg 30 in the opposite axial direction 10. It is preferred here if—as with the projecting protrusions 34, 36 on the tubular section 24—at least two or three projecting protrusions 46 spaced apart, if appropriate uniformly, in the circumferential directions 16, 18 are provided, with which corresponding apertures 48, preferably in the form of the elongate openings for centrifugally driven oil, are associated. Since the cross section of the supporting ring 6 in the variant embodiment shown in FIG. 8 has only one radial leg 30, this is of continuous design in the circumferential directions 16, 18, while the axial leg 32 can quite possibly be of interrupted design in the circumferential directions 16, 18 in order to reduce the weight of the supporting ring 6. As regards the supporting function of the supporting ring 6, it is preferred however if the axial leg 32 is also of continuous design in the circumferential directions 16, 18.

FIG. 9 shows a seventh variant embodiment of the supporting ring 6, wherein the variant embodiment shown in FIG. 9 corresponds substantially to the variant embodiment shown in FIG. 8, and therefore only the differences will be explored below, the same reference signs are used for the same or similar parts and the above description otherwise applies accordingly.

As can be seen from FIG. 9, in contrast to the supporting ring 6 shown in FIG. 8, a radial leg 38 initially adjoins the axial leg 32 in axial direction 8 in the case of the supporting ring 6, wherein the radial leg 38 extends outward in radial direction 12 from the axial leg 32. Adjoining the radial leg 38 outward in radial direction 12 there is a further axial leg 50, which extends in axial direction 8 from the radial leg 38. Adjoining the end of axial leg 50 which faces in axial direction 8 there is, in turn, a radial leg 30, which extends inward in radial direction 14 so as to be arranged in front of the free end 26 of the tubular section 24—like the radial leg 30 shown in FIG. 8. In the variant embodiment shown in FIG. 9 too, therefore, the supporting ring 6 can be supported or is supported in axial direction 10 on the tubular section 24 or the free end 26 of the tubular section 24 via radial leg 30, while the supporting ring 6 is once again supported in the opposite axial direction 8 by means of the projecting protrusion or protrusions 46, which have already been described above. Since, in the variant embodiment shown in FIG. 9, two radial legs 30, 38 are provided, one of the two radial legs 30, 38 can be of interrupted design in the circumferential directions 16, 18, while the other can be of continuous design in the circumferential directions 16, 18. As already mentioned above, however, it is advantageous here if both radial legs 30, 38 are of continuous design in the circumferential directions 16, 18 in order to ensure particularly good support from the supporting ring 6. In the variant embodiment shown in FIG. 9, axial leg 32 and radial leg 38 surround the tubular section 24, whereas radial leg 30 is arranged behind the free end 26 of the tubular section 24 in axial direction 8. As shown in FIG. 9, axial leg 50 can be of such short design that the side of radial leg 30 which faces in axial direction 10 rests on that side of radial leg 38 which faces in axial direction 8 in order to achieve a particularly compact structure, but axial leg 50 can also be of longer design in order to space apart the two abovementioned sides of radial legs 30 and 38, at least partially.

FIG. 10 shows an eighth variant embodiment of the supporting ring 6, wherein the variant embodiment shown in FIG. 10 corresponds substantially to the variant embodiment shown in FIG. 8, and therefore only the differences will be explored below, the same reference signs are used for the same or similar parts and the above description otherwise applies accordingly.

In contrast to the variant embodiment shown in FIG. 8, the cross section of the supporting ring 6 in the variant embodiment shown in FIG. 10 has a further radial leg 38. Radial leg 38 adjoins the axial leg 32 in axial direction 10, wherein radial leg 38 extends outward in radial direction 12 from the axial leg 32. Thus, a supporting ring 6 is provided, the cross section of which has the axial leg 32, adjoining which there is, on the one hand, in this case in axial direction 10, the one radial leg 38, which extends outward in one radial direction 12, and, on the other hand, in this case in axial direction 8, the other radial leg 30, which extends inward in the opposite radial direction 14. In this case, the axial leg 32 and radial leg 38 surround the tubular section 24, while radial leg 30 is arranged behind the free end 26 of the tubular section 24 in axial direction 8. In this variant embodiment too, at least one of the radial legs 30, 38 should be of continuous design in the circumferential directions 16, 18, wherein this should preferably be radial leg 38. Nonetheless, it is preferred here too if both radial legs 30, 38 are of continuous design in the circumferential directions 16, 18 in order to optimize the supporting function of the supporting ring 6, although not the weight thereof.

FIG. 11 shows a ninth variant embodiment of the supporting ring 6, wherein the ninth variant embodiment corresponds substantially to the variant embodiment shown in FIG. 6, and therefore only the differences will be explored below, the same reference signs are used for the same or similar parts and the above description otherwise applies accordingly.

In contrast to the variant embodiment shown in FIG. 6, radial leg 30 in the variant embodiment shown in FIG. 11 is extended inward in radial direction 14 to such an extent that it is arranged in front of the free end 26 of the tubular section 24, with the result that the supporting ring 6 can be supported or is supported in axial direction 10 on the tubular section 24 or the free end 26 of the tubular section 24 via radial leg 30, as has already been described with reference to FIGS. 8 to 10. In contrast, axial leg 32 and radial leg 38 surround the tubular section 24. In axial direction 8, the supporting ring 6 can be supported or is supported on the tubular section 24 via the projecting protrusions 46 already indicated with reference to FIGS. 8 to 10, wherein the projecting protrusions 46 are provided on the end section 44 of radial leg 38 so as to extend inward in radial direction 14 into the apertures 48 in the form of the openings for centrifugally driven oil, which have been described with reference to FIGS. 8 to 10. At least one of the two radial legs 30, 38 is of continuous design in the circumferential directions 16, 18, while the other radial leg 38, 30 can quite possibly be of interrupted design in the circumferential directions 16, 18, although it is preferred in this variant embodiment if at least radial leg 38 is of continuous design in the circumferential directions 16, 18 or both radial legs 30, 38 are of continuous design in the circumferential directions 16, 18.

LIST OF REFERENCE SIGNS 2 plate carrying device
4 plate carrier
6 supporting ring
8 axial direction
10 axial direction
12 radial direction
14 radial direction
16 circumferential direction
18 circumferential direction
20 longitudinal axis
22 supporting section
24 tubular section
26 free end
28 outer side
30 radial leg
32 axial leg
34 projecting protrusion
36 projecting protrusion
38 radial leg
40 open side
42 end section
44 end section
46 projecting protrusion
48 aperture
50 axial leg

The invention claimed is:

1. A plate carrying device (2), for a multiplate clutch or brake, having
a plate carrier (4), which has a tubular section (24), and
a supporting ring (6), which surrounds the tubular section (24) and on which the tubular section (24) can be supported or is supported outwardly in a radial direction (12),
wherein a cross section of the supporting ring (6) has at least one radial leg (30) extending substantially in a radial direction (12, 14), and
wherein the cross section has a further radial leg (38) extending substantially in the radial direction (12, 14).

2. The plate carrying device (2) as claimed in claim 1, wherein the cross section furthermore has an axial leg (32; 50), which extends substantially in an axial direction (8, 10).

3. The plate carrying device (2) as claimed in claim 2, wherein the axial leg (32) surrounds the tubular section (24), and the supporting ring (6) can be supported or is supported in the axial direction (10) on the tubular section (24).

4. The plate carrying device (2) as claimed in claim 2, wherein the axial leg (32; 50) is of continuous design in circumferential directions (16, 18) and wherein the supporting ring (6) has an L-shaped cross section.

5. The plate carrying device (2) as claimed in claim 1, wherein the cross section of the supporting ring (6) has an axial leg (32), which is adjoined, on the one hand, by the at least one radial leg (30) and, on the other hand, by the further radial leg (38).

6. The plate carrying device (2) as claimed in claim 1, wherein the supporting ring (6) has a U-shaped or semicircular cross section, an open side (40) of which faces inward or outward in the radial direction (14, 12).

7. The plate carrying device (2) as claimed in claim 1, wherein the supporting ring (6) can be supported or is supported in at least one axial direction (8; 10), on the tubular section (24), and
wherein at least one protrusion (46), which projects in the radial direction (14) and extends into an aperture (48), thereby supporting the supporting ring (6) in at least one of the axial directions (8; 10), is provided on the supporting ring (6).

8. The plate carrying device (2) as claimed in claim 7, wherein the supporting ring (6) can be supported or is supported in the at least one axial direction (8) by means of the at least one projecting protrusion (46) and in the axial direction (10) by means of the at least one radial leg (30) on the tubular section (24).

9. The plate carrying device (2) as claimed in claim 1, wherein the at least one radial leg (30) and/or the further radial leg (38) slopes/slope by less than 45°, relative to a radial plane and extends/extend in the radial plane.

10. The plate carrying device (2) as claimed in claim 1, wherein the at least one radial leg (30) and/or the further radial leg (38) is/are of continuous design in circumferential directions (16, 18).

11. The plate carrying device (2) as claimed in claim 1, wherein the supporting ring (6) is designed as a sheet-metal part, and/or is of integral design.

12. The plate carrying device (2) as claimed in claim 1, wherein the supporting ring (6) has a closed design in circumferential directions (16, 18).

13. The plate carrying device (2) as claimed in claim 1, wherein the tubular section (24) is a plate carrying section of the plate carrier (4), and/or the plate carrier (4) is an outer or inner plate carrier, wherein the supporting ring (6) on the inner plate carrier is not designed as a torque-transmitting friction partner.

14. A multiplate clutch or brake having the plate carrying device (2) as claimed in claim 1, wherein either no driving disk is provided, or a driving disk which is in rotary driving connection with the plate carrier (4) is provided, for the plate carrier (4), wherein the supporting ring (6) is formed separately from the driving disk.

15. The plate carrying device (2) as claimed in claim 1, wherein the at least one radial leg (30) extends inward in the radial direction (14) in front of a free end (26) of the tubular section (24), and the supporting ring (6) can be supported or is supported in an axial direction (10) on the tubular section (24) by the at least one radial leg (30).

16. The plate carrying device (2) as claimed in claim 1, wherein the at least one radial leg (30) and/or the further radial leg (38) slopes/slope by less than 10°, relative to a radial plane and extends/extend in the radial plane, and/or an axial leg (32) slopes by less than 10°, relative to a longitudinal axis (20) and extends parallel to the longitudinal axis (20).

17. A method for producing the plate carrying device (2) as claimed in claim 1 comprising the following method steps:

preparing a sheet-metal part in a form of an annular disk, forming the sheet-metal part in the form of the annular disk to produce the supporting ring (6) with the cross section which has the at least one radial leg (30) extending substantially in the radial direction (12, 14) and the further radial leg (38) extending in the radial direction (12, 14), and mounting the supporting ring (6) on the tubular section (24) of a prepared plate carrier (4), with a result that the tubular section (24) can be supported or is supported on the supporting ring (6) outwardly in the radial direction (12).

\* \* \* \* \*